Nov. 26, 1940.  N. TESTI  2,223,310
SHAVING IMPLEMENT
Filed March 24, 1937
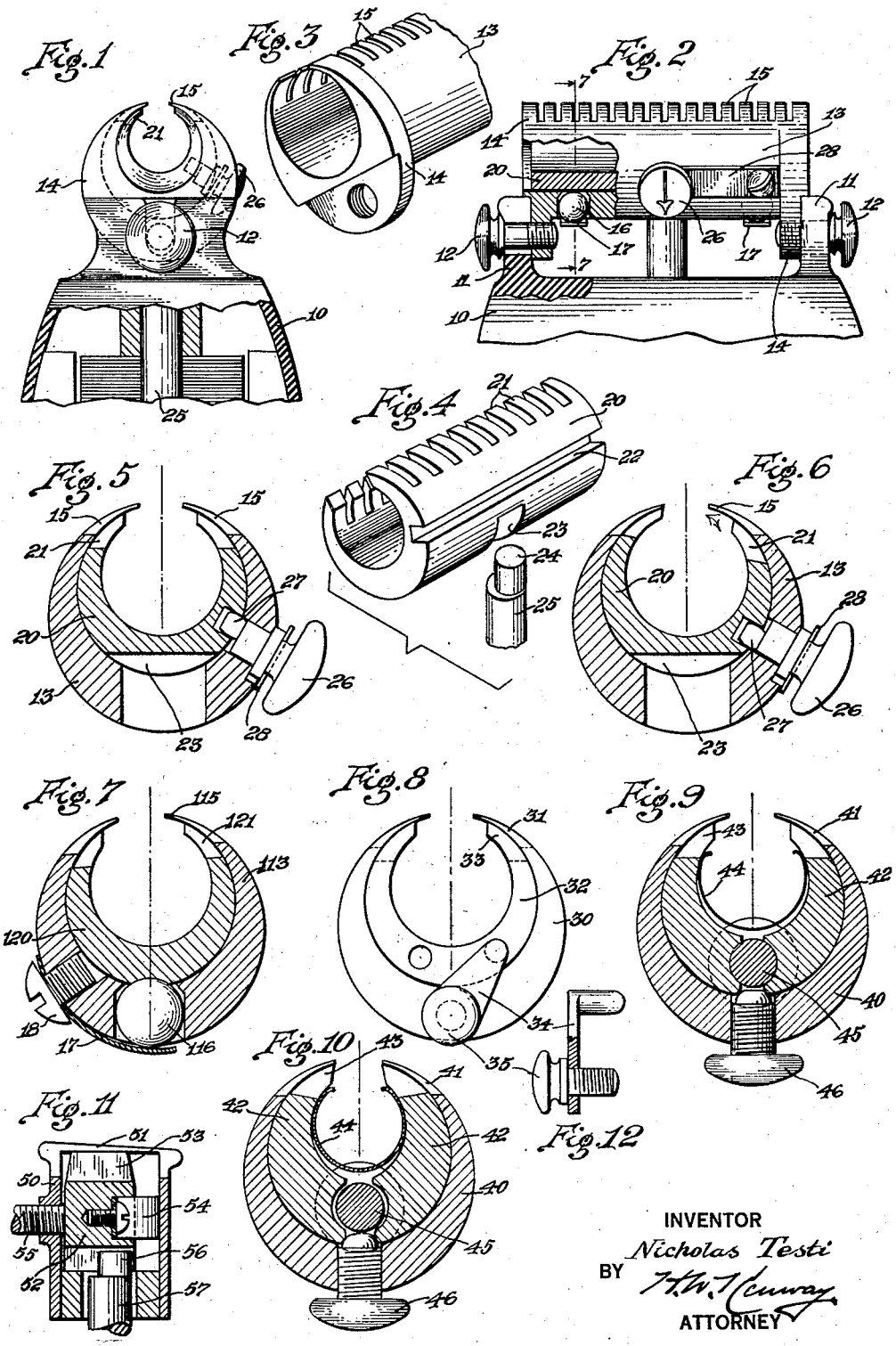
INVENTOR
*Nicholas Testi*
BY
ATTORNEY Patented Nov. 26, 1940

2,223,310

UNITED STATES PATENT OFFICE 2,223,310

SHAVING IMPLEMENT

Nicholas Testi, Boston, Mass., assignor to Gillette Safety Razor Company, Boston, Mass., a corporation of Delaware Application March 24, 1937, Serial No. 132,811

7 Claims. (Cl. 30—43)

This invention relates to dry-shaving implements embodying relatively movable shearing members. Its object is in general to improve the efficiency of such implements and to render them flexible or adjustable in respect to the character of the shave given by them. It has been found in practice that upon the cheeks and portions of the face which are naturally firm a closer shaving adjustment is practicable than upon the softer parts of the face and that users having firm flesh and a tough epidermis can use with comfort and advantage an implement set for a closer shave than users having soft flesh and a more delicate epidermis. The present invention contemplates the provision of an implement wherein adjustment for close to coarse shaving conditions and vice-versa may be accurately and conveniently effected.

The nature of the invention as well as its features and advantages will be best understood and appreciated from the following description of several preferred embodiments thereof, selected for purposes of illustration and shown in the accompanying drawing, in which—

Fig. 1 is an end view on an enlarged scale of an implement having a guard and cutter of cylindrical type, portions of the casing being shown as broken away;

Fig. 2 is a corresponding view in front elevation, portions being shown in sections;

Fig. 3 is a fragmentary view in perspective on a still larger scale of the guard member;

Fig. 4 is a view in perspective of the cutter member showing also the end of the motor shaft;

Figs. 5 and 6 are views in cross-section on a still larger scale showing the cutter in two different positions of adjustment;

Fig. 7 is a similar view in cross-section of a modification;

Fig. 8 is an end view upon the same enlarged scale of a guard and cutter having a modified form of adjusting devices;

Figs. 9 and 10 are cross-sectional views showing a guard and cutter of another modified form;

Fig. 11 is a sectional view of another implement in which the invention is embodied having a flat guard plate; and Fig. 12 is a view in elevation, partly in section of the cutter adjusting device of the implement shown in Fig. 8.

As already explained an implement having a cylindrical cutter head has been selected for purposes of illustration although the invention is in no sense limited to dry-shaving implements of this or of any specific type. As shown in Figs. 1 to 7, however, the implement includes in its structure a casing 10 of "Bakelite" or other mouldable material which is shaped to serve as a handle for the implement and also as a housing for the motor operating it. The casing 10 is provided at its upper end with upstanding flanges 11 each forked to receive a clamping screw 12 and to engage between them downwardly extending flanges formed in end plates 14 which are formed integral with or otherwise rigidly attached to the cylindrical body of the head or guard member 13. The flanges of the end plates are threaded to receive the clamping screws 12 and by loosening the screws sufficiently to disengage these flanges the head with its enclosed cutter may be detached conveniently as a complete unit.

The guard 13, as already stated, has a cylindrical body and this contains an eccentric longitudinal bore so disposed that the upper cylindrical wall of the guard member tapers to a slight thickness, that is to say, perhaps .005" or .006". The body of the guard member is longitudinally slotted along the axis of minimum thickness and it is transversely slotted to form two series of stationary shearing teeth 15, one on each side of its longitudinal slot, as will be presently explained. The transversely extending teeth 15 thus formed are located between the outer cylindrical surface of the guard 13 and the inner cylindrical surface of its eccentric bore and taper toward each other. Shearing takes place at the inner edges of these stationary teeth as will be presently explained.

The cutter comprises an elongated hollow cylindrical member 20, best shown in Fig. 4, of a diameter that fits snugly and slides within the bore of the guard member 13. It also has an eccentric longitudinal bore so that the thickness of its wall is reduced at one side. It is longitudinally slotted with a slot of somewhat greater width than the corresponding guard member 13. It is transversely slotted so that a series of shearing teeth 21 is presented along each edge of its longitudinal slot. These teeth are of substantially the same width as the teeth 15 of the cutter or slightly narrower. The cutter teeth 21 underlie the teeth 15 of the guard and present movable shearing edges which co-operate with those of the guard teeth. A rapid longitudinal vibration is imparted to the cutter 20 by the rotation of the motor shaft 25 which is provided with an eccentric head 24 fitted in a transverse slot 23 formed in the bottom of the cutter. The cutter is thus moved from an open position wherein the teeth register with the teeth of the guard to shearing position in which the edges of its teeth pass by the edges of the guard teeth 15.

The cutter 20 is normally urged upwardly in a yielding manner so that the cutter teeth 21 are firmly engaged against the stationary teeth 15 of the guard by means of balls 16 which are retained in suitable sockets provided for them in the lower and thicker portion of the guard member and wherein they are engaged and pressed upwardly by the leaf-springs 17 secured to the guard by screws 18, as clearly shown in Fig. 7.

The angular or circumferential position of the cutter 20 in the implement herein shown is determined by an adjusting stud 26 which is rotatably mounted in one side of the guard member and is provided with an eccentric head slidably received in groove 22 extending longitudinally in one wall of the cutter. The adjusting stud 26 is held in place by a forked leaf-spring 28 which creates sufficient pressure upon the stud to hold it frictionally against displacement. It will be understood that the groove 22 of the cutter permits the cutter to slide freely and longitudinally within the guard upon the eccentric head 27 of the stud 26. In Fig. 5 the stud is shown with its eccentric head 27 positioned substantially centrally and thus holding the cutter in a symmetrical relation with respect to the guard, that is to say, the ends of the teeth 21 of the cutter are overlapped by and offset equally within the ends of the teeth 15 of the guard. The two shearing zones are thus located in positions upon the guard teeth 15 corresponding to a coarse shaving, the length of stubble being approximately gauged by the thickness of the teeth 15 at a point where they overlap the ends of the cutter teeth 21.

In Fig. 6 the adjusting stud 26 is represented as having been turned approximately 180°, that is corresponding to a position of closest shave on the left-hand side of the guard and to a position of coarsest shave on the right-hand side of the guard. The user may employ the implement in this condition of adjustment keeping a coarse cut over the right-hand side of the guard and an extremely fine shave over the left-hand side of the guard or he may at any time while shaving, or without stopping the motor turn the adjusting knob 26 to get an intermediate condition The knob 26 is provided with an arrow or other marking indicating its position of adjustment.

The shaving zone may thus be shifted circumferentially beneath the tapering teeth 15 of the guard member and when the shaving zone is located beneath the outer ends of these teeth, in a position corresponding to their minimum thickness, a very close shaving operation results. On the other hand, when the shaving zone is shifted to a position corresponding to a thicker portion of the teeth 15 the shaving effect is rendered correspondingly coarser.

In the construction of Figs. 1 to 6 both the guard member 13 and the cutter 20 are symmetrically shaped, that is, the teeth on both sides of these members are equally spaced from a central axial plane. Further, in initial position these members are symmetrically assembled as suggested in Fig. 5 with the stationary shearing teeth 15 overlapping the teeth 21 of the reciprocating cutter by the same amount on both sides. When the cutter is adjusted by turning the knob 26 the cutting zone on one side is shifted nearer to the tip of the guard teeth 15 and on the other side it is shifted away from the tip of the teeth.

The extreme position of adjustment is shown in Fig. 6 wherein the teeth 21 of the cutter 20 on the left-hand side register with the stationary teeth 15 of the guard and on the right-hand side of the cutter the teeth 21 have been moved opposite to the base or thicker end of the teeth 15 of the guard. By reason of the transverse slot 23 in which the eccentric head 24 is seated adjusting movement of the cutter may be effected without interrupting the driving connection thereto.

In the modified construction of Fig. 7 the parts of the implement are in general similar to those already described but the location of both the cutter and the guard teeth is unsymmetrical. As shown, the right-hand series of guard teeth 115 is located substantially nearer to the central axial plane of the cutter than are the teeth on the left-hand side. The teeth 121 of the cutter 120 are correspondingly located. In the implement as originally assembled, while the guard and cutter have a symmetrical relation to each other, the two shearing zones are displaced somewhat toward the left as compared to the shearing zones of the implement as shown in Fig. 5. The guard member 113 is provided with a socket in this lower and thicker portion for a steel ball 116, the latter being held in place by a leaf-spring 17 secured to the guard by a screw 18. The cutter 120 has a central longitudinal groove in its lower surface in which slides the ball 116 and thus the cutter is prevented from twisting in the guard. If now it is desired to adjust this implement the cutter may be withdrawn, reversed end for end and again inserted in the guard. The effect of this reversal is to bring the longer cutter teeth beneath the shorter guard teeth and in this position they substantially register in the manner suggested in Fig. 6. The adjustment in this case is, therefore, effected by the reversal of the unsymmetrical cutter in its guard member.

The construction shown in Fig. 8 is similar to that illustrated in Figs. 1 to 6 except in the device for holding the cutter in adjusted position. In this instance the cutter 32 is provided in one end with a pair of spaced holes to receive an inwardly extending pin formed on the end of an arm 34 The arm 34 is perforated at its outer end to receive a clamping screw 35 which is threaded into the end of the guard 30. As shown in Fig. 8, the pin on the arm 34 engages the right-hand hole in the cutter 32 and this hole is so located as to maintain the cutter in symmetrical position with respect to the guard. The left-hand hole, however, is located somewhat closer to the median plane of the cutter so that when the arm 34 is swung toward the left the cutter must be rocked in a clockwise direction to bring the hole into registration with the pin on the arm 34 and will occupy a position corresponding to that of Fig. 6, that is to say, with the ends of the cutter teeth on one side substantially registering with the ends of the guard teeth 31 on the left-hand side of the guard.

In Figs. 9 and 10, the guard 40 encloses a pair of jointed cutter sections 42 which are arranged for opening and closing movement about a longitudinal pivot pin 45. A circular leaf-spring 44 tends at all times to separate the toothed edges of the cutter sections 42, and these sections are arranged to be closed in or contracted against the pressure of the spring 44 by an adjusting stud 46 threaded into the lower portion of the guard 40 and have a tapered end arranged to bear against the outer edges of the two cutter sections. The stud 46 also serves to hold the cutter against turning in the guard.

In Fig. 10 the adjusting stud 46 is shown as advanced to its extreme innermost position, in which the ends of the cutter teeth 43 of both cutter sections 42 are located in substantial registration with the ends of the guard teeth 41. When, however, the adjusting stud 46 is retracted the cutter sections 42 immediately open under the pressure of the spring 44 and the ends of the cutter teeth 43 retreat from the ends of the guard teeth 41 into positions of coarser shaving.

In Fig. 11 the invention is shown as embodied in dry-shaving implements having a guard 50 with the flat end shearing plate 51 which tapers uniformly from left to right and is slotted transversely to provide a series of stationary shearing teeth. The cutter 52 is provided with a toothed body portion having teeth 53 maintained in shearing engagement with the underside of the guard plate 51. A leaf-spring 54 tends always to move the cutter 52 transversely to shaving position beneath the thicker side of the shearing plate 51. An adjusting screw 55 bears upon the other side of the cutter 52 and serves to displace it transversely toward the right when turned into the casing 50. This brings the cutter into a position of closer shaving in opposition to the action of the leaf-spring 54. The mounting of the cutter is such as to permit it to have free longitudinal vibration and this is imparted to it by an eccentric head 56 on the upper end of the motor shaft 57.

The operation and adjustment of the various implements herein shown is similar in character except that in the implements of Figs. 1 to 8 adjustment takes place in an opposite sense beneath the two sides of the guard, whereas in the implement of Figs. 9 and 10, the adjustment takes place in the same sense, that is, both sides of the cutter are simultaneously adjusted toward a closer or coarser shaving condition, whereas, in the implements of the other figures one side is adjusted toward a closer shaving and the other simultaneously toward a coarser shaving condition.

Having thus disclosed my invention and described specific embodiments thereof for purposes of illustration and not limitation, I claim as new and desire to secure by Letters Patent:

1. A dry shaving implement comprising an outer fixed member having two opposed series of tapering teeth arranged with the ends of the teeth separated by an open space, a cutter having two similar series of teeth underlying those of the outer member, means for reciprocating the cutter, and an eccentric pin movable into different fixed positions for adjustably and simultaneously determining the transverse location of its teeth in both series with respect to those of the outer member.

2. A dry shaving implement comprising a stationary guard having a cylindrical outer surface and an eccentric bore therein between which are located curved tapering shearing teeth, a toothed cylindrical cutter mounted to reciprocate in the guard, and an eccentrically mounted pin movable to rock said cutter to different positions of adjustment in the guard and correspondingly to control its path of reciprocation.

3. A dry shaving implement comprising relatively movable shearing members having teeth of varying effective thickness, an eccentric stud having a fixed bearing, engaging one of said members and being movable for relatively adjusting said members, and means for indicating the extent of such adjustment.

4. A dry shaving implement comprising an outer cylinder fixed in the implement and having opposed series of shearing teeth tapering toward a common intermediate slot, a similarly shaped cutter mounted for reciprocation therein, and adjustable guiding means for positively determining the circumferential position of the cutter teeth with respect to the teeth of the outer cylinder, said guiding means comprising a pin eccentrically mounted in one member and slidably engaged with the other.

5. A dry shaving implement comprising an outer stationary member provided with a longitudinal bore and transverse tapered shear teeth, a cylindrical cutter having a straight longitudinal slot in its wall and being mounted to reciprocate in said bore, and a pin mounted eccentrically in the outer member and arranged to engage in said slot and confine the cutter to straight line reciprocation while controlling the angular position of the cutter in said stationary member.

6. A dry shaving implement comprising an outer stationary member provided with a longitudinal bore and transverse tapered teeth, a cylindrical cutter having a longitudinal slot in its wall and being mounted to reciprocate in said bore, actuating means for the cutter having a transversely adjustable connection therewith, and an eccentric pin mounted in the outer member and arranged to engage in said slot and thereby to control the angular position of the cutter in its reciprocation.

7. A dry shaving device of the character described, having a cutter head comprising a body having at one side two spaced rows of stationary shearing teeth facing in opposite directions with their free ends toward each other, a hollow movable cutter having a separate set of cutter teeth co-operating with each row of stationary teeth, said two sets of cutter teeth being spaced from each other with the free ends of the teeth in each set directed toward the other set, the free ends of the outer stationary teeth projecting beyond the free ends of the inner movable cutter teeth and extending inwardly so as to overlap a portion of the free ends of these inner teeth, means for reciprocating the inner cutter teeth in a direction transversely of the stationary teeth to co-operate therewith for cutting, and an eccentric pin adjustably mounted in the head and having sliding engagement with the cutter for adjustably controlling its path of reciprocation.

NICHOLAS TESTI.